Oct. 29, 1940.  W. S. PIERCE, JR  2,219,370
INDICATOR SUPPORT
Filed Jan. 10, 1939
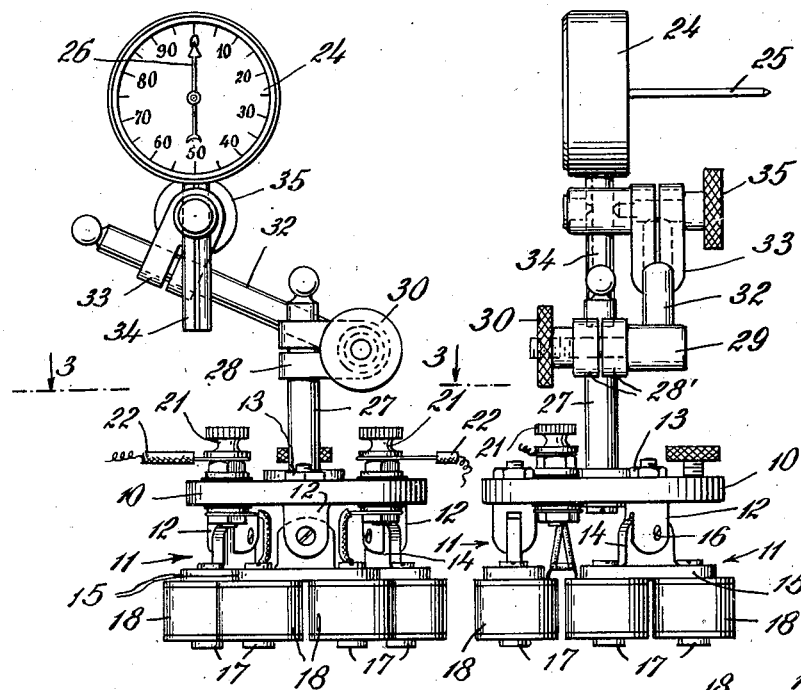
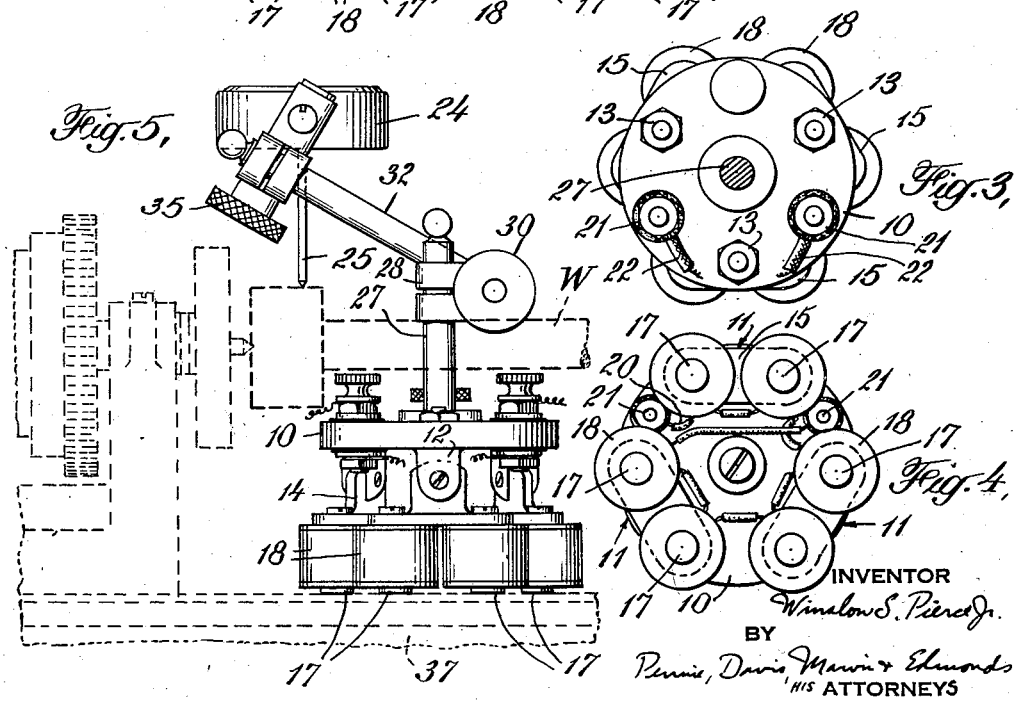
INVENTOR
Winslow S. Pierce Jr.
BY
Pennie, Davis, Marvin & Edmonds
HIS ATTORNEYS Patented Oct. 29, 1940

2,219,370

UNITED STATES PATENT OFFICE 2,219,370

INDICATOR SUPPORT

Winslow S. Pierce, Jr., Bayville, N. Y.

Application January 10, 1939, Serial No. 250,184

1 Claim. (Cl. 248—168)

This invention relates to supporting devices, and more particularly concerns an improved device of this type which is held to a base by magnetic attraction. The new support automatically adapts itself to irregularities in the surface to which it is applied, and because of its stability it may be used to particular advantage in mounting precision measuring instruments, such as dial indicators, gauges, and the like.

Magnetic supports have heretofore been proposed for mounting various devices on a base, but these supports have generally included a single magnet which in some instances forms a single base contacting element and in other instances forms a pair of rigid base contacting legs. A support having a single base contacting element is unsatisfactory because irregularities in the surface on which the support is mounted may prevent the support from seating firmly on the base and thus allow it to rock. Further, the single point support is inherently unstable and is easily jarred out of position. The use of a pair of magnetic legs tends to increase stability in the plane of the legs but not in other planes, and such a support is, therefore, subject to accidental movement. The rigidity of the legs of known supports renders them incapable of adapting themselves properly to uneven or sloping surfaces, so that a considerable part of the magnetic holding force of the legs is frequently ineffective.

The present invention is directed to the provision of a novel support of the magnetic type which overcomes the above noted and other disadvantages of prior devices, in that it is stable and secure even when mounted on an irregular surface.

A support made in accordance with my invention comprises generally a multi-legged structure or tripod having at least one and preferably each of its legs in the form of a magnet adapted to seat directly on a metallic base so that the magnetism in the legs exerts a holding force on the base. The legs of the device may be equidistant, and the ends of the legs which seat on the base may be relatively small in area so as to more readily accommodate irregularities in the surface of the base. In accordance with the invention, the magnetic legs of my support may be pivotally secured to the body thereof whereby they may move relative to each other in accommodating the device to irregular surfaces. In a preferred form of my device, the support comprises a main body having three legs, one or more of which comprises a magnet pivotally connected to the body so that the magnet may swing about a horizontal axis with the end of the magnet extending downwardly from the body and adapted to seat on a base. The magnets may be of bar or U-shaped form and may comprise permanent or electromagnets. When electromagnets are employed, the windings may be connected, either in series or in parallel, to binding posts on the body, and a battery or other current source may be connected to these posts to energize the windings.

By reason of the tripod construction, the lower ends of the magnetic legs may be made relatively small in area without detracting from the stability of the support, and by making these ends small they are adapted to fit closely against irregular surfaces, so that the holding power of the legs is not substantially impaired. When U-shaped magnets are used, the two legs of each magnet bear directly on the supporting surface even though the surface is irregular, curved or inclined, because the pivotal connection of the leg structure to the main body allows the legs to assume positions normal to the part of the surface which they contact.

For a better understanding of the invention, reference may be had to the accompanying drawing, in which an embodiment thereof has been illustrated. In the drawing—

Figures 1 and 2 are front and side views, respectively, of one form of support embodying the invention with a dial indicator mounted thereon;

Figure 3 is a plan view of the device shown in Figures 1 and 2, with the indicator and its mounting removed;

Figure 4 is a bottom view of the device shown in Figures 1 and 2; and

Figure 5 is a front view of the device of the preceding figures illustrating one of its uses.

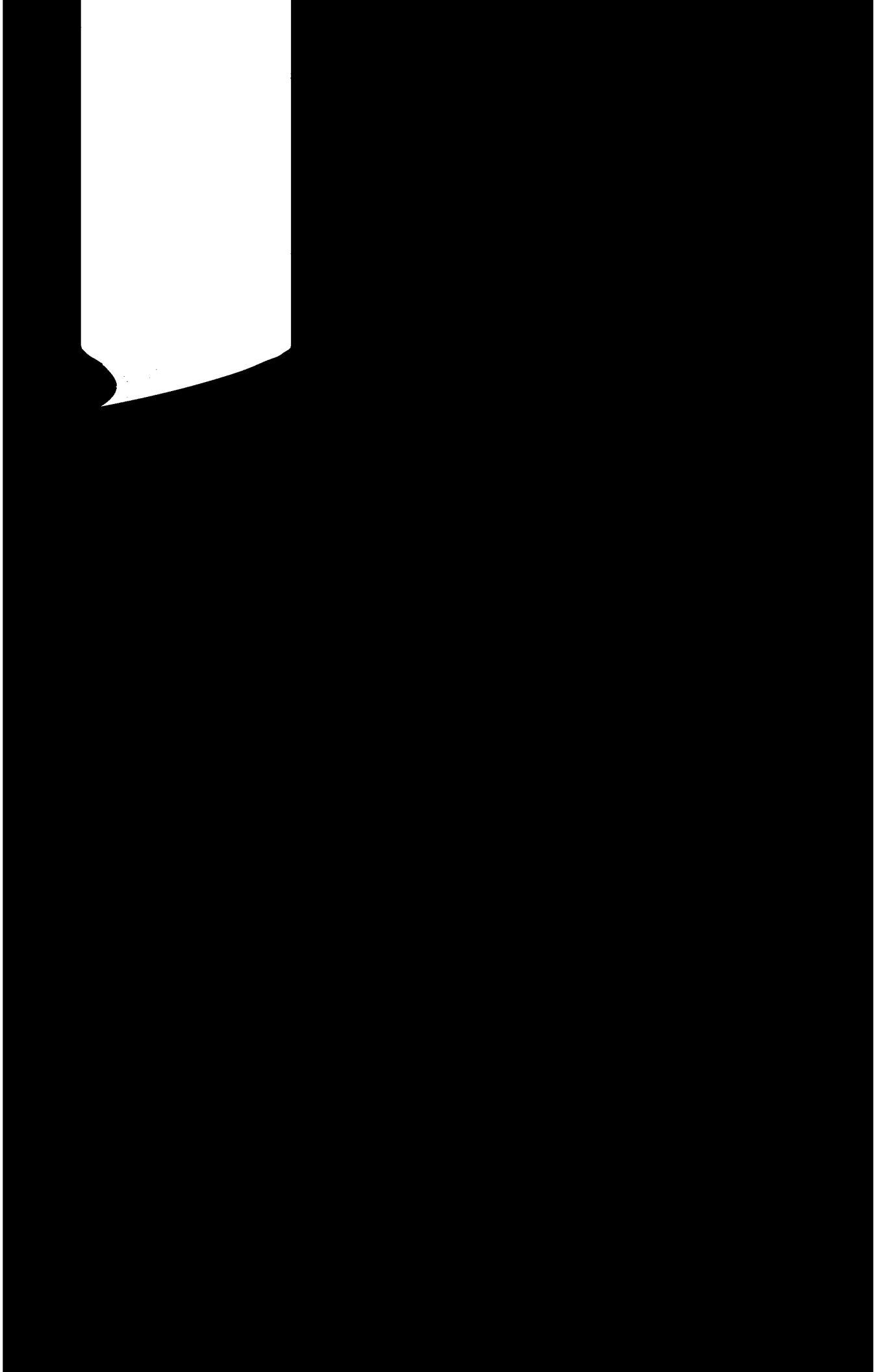

The disclosed embodiment of my support comprises a main body 10 in the form of a circular plate from which extend three substantially equidistant depending legs designated generally by the numerals 11. Each of the legs 11 comprises a lug 12 fixed to the bottom of the plate 10 by suitable means such as a threaded stem extending through an opening in the plate and a nut 13 threaded on the upper end of the stem and screwed against the top of the plate. At its lower end, each of the lugs 12 is bifurcated, and fitted closely between the bifurcations is a projection 14 forming part of a crosspiece 15. The projection 14 is pivotally connected to the lug by a pivot pin 16 extending through the bifurcations